July 21, 1959 C. J. GOODMAN ET AL 2,896,020

MULTIPLE TRANSMITTER CONTROL CIRCUIT

Filed Oct. 29, 1954 9 Sheets-Sheet 1

INVENTORS: C. J. GOODMAN
C. R. WALKER
BY R. C. Terry
ATTORNEY

MULTIPLE TRANSMITTER CONTROL CIRCUIT

Filed Oct. 29, 1954 9 Sheets-Sheet 2

INVENTORS: C.J. GOODMAN
C.R. WALKER
BY
R.C. Terry
ATTORNEY

MULTIPLE TRANSMITTER CONTROL CIRCUIT

Filed Oct. 29, 1954 9 Sheets-Sheet 3

INVENTORS: C. J. GOODMAN
C. R. WALKER
BY
R.C. Terry
ATTORNEY

INVENTORS: C. J. GOODMAN
C. R. WALKER
BY
R. C. Terry
ATTORNEY

MULTIPLE TRANSMITTER CONTROL CIRCUIT

Filed Oct. 29, 1954 9 Sheets-Sheet 5

INVENTORS: C. J. GOODMAN
C. R. WALKER
BY R. C. Lerry
ATTORNEY

MULTIPLE TRANSMITTER CONTROL CIRCUIT

Filed Oct. 29, 1954 9 Sheets-Sheet 6

INVENTORS: C.J. GOODMAN
C.R. WALKER
BY R.C. Terry
ATTORNEY

MULTIPLE TRANSMITTER CONTROL CIRCUIT

INVENTORS: C. J. GOODMAN
C. R. WALKER
BY R. C. Terry
ATTORNEY

INVENTORS: C. J. GOODMAN
C. R. WALKER
BY
R. C. Terry
ATTORNEY

July 21, 1959 C. J. GOODMAN ET AL 2,896,020

MULTIPLE TRANSMITTER CONTROL CIRCUIT

Filed Oct. 29, 1954 9 Sheets-Sheet 9

INVENTORS C. J. GOODMAN
C. R. WALKER

BY John E. Cassidy

ATTORNEY 2,896,020

MULTIPLE TRANSMITTER CONTROL CIRCUIT

Charles J. Goodman, Valhalla, N.Y., and Charles R. Walker, Jersey City, N.J., assignors to American Telephone and Telegraph Company, a corporation of New York Application October 29, 1954, Serial No. 465,672

8 Claims. (Cl. 178—17.5)

This invention relates to telegraph transmission systems, and particularly to systems in which two or more transmitters have access to a common transmission channel in rotation.

More specifically, the invention relates to the preparation of message storage records and the automatic transmission of the messages from those records to a transmission channel by at least two record-controlled transmitters having access to said channel in rotation.

An object of the invention is to provide for the preparation, in storage record form, of a restricted number of messages while the transmitter, to which the storage record is allocated, is awaiting access to the transmission channel.

Another object of the invention is to suspend transmission upon reception of a break signal and to preclude the storing of message signals beyond completion of any messages then in process of being stored.

A further object of the invention is to requalify the message record preparing instrumentalities for operation upon the clearing of the break condition.

Another object of the invention is to release and discard from storage all message storage records awaiting transmission when a break condition has remained uncleared for a predetermined interval.

One of the features of the invention is that messages are prepared by operation of a keyboard transmitter which transmits directly and locally into a reperforator-transmitter, in which a perforated tape containing the message signals is produced.

Another feature of the invention is that the retransmission of a message being perforated in a tape cannot begin until the recording of that message has been completed, as evidenced by response of the reperforator to an end-of-message signal.

Another feature of the invention is that at least two reperforator-transmitters are provided for transmitting to a single outgoing channel, and they have access to that channel alternately in rotation for the transmission of a single message in each transmitting turn as long as any message is awaiting transmission.

The invention features an arrangement individual to each reperforator-transmitter for counting each occurrence of response of the reperforator to an end-of-message signal and for reducing the count by one upon initiation of transmission of a message from a reperforator-transmitter so that the number of messages in storage and awaiting transmission by each reperforator-transmitter is always registered.

Another feature of the invention is that when a predetermined number of messages in storage has been registered, in the specific arrangement disclosed, three messages, the keyboard transmitter, which supplies signals to the particular reperforator-transmitter, is disabled, and the preparation of another message cannot be commenced until the transmission of one message then in storage is completed.

The invention also features an arrangement for bringing in an alarm if an operator fails to transmit, at the end of a message, the end-of-message signal.

The invention also features an arrangement in accordance with which the sensing and transmission of an end-of-message signal by the transmitting portion of a reperforator-transmitter causes transmission by that transmitter to be suspended, and the transmission channel is made available to the transmitting portion of another reperforator-transmitter.

The invention features an arrangement in accordance with which the reception of a break signal from a remote station, to which the reperforator-transmitters transmit their messages, will immediately result in the stopping of the transmitter that is then transmitting, and if none is transmitting, it will preclude the starting of any transmitter to transmit an outgoing message.

Another feature of the invention is that a received break signal causes the disablement of all keyboard transmitters upon the response of the associated reperforator-transmitters to the end-of-message signals terminating messages in process of preparation at the time of reception of the break signal or begun after the reception thereof.

Another feature of the invention is that, if an operator fails to clear out a break condition within a predetermined time, the transmitting portions of all reperforator-transmitters having message material in storage will be set in operation, and the tapes will be run out and thereby discarded without transmission of the messages contained therein.

For a complete understanding of the invention reference may be had to the following detailed description to be interpreted in the light of the accompanying drawing, in which:

Figs. 2 and 3 contain the common relay circuits for the two message-originating positions;

Figure 10:
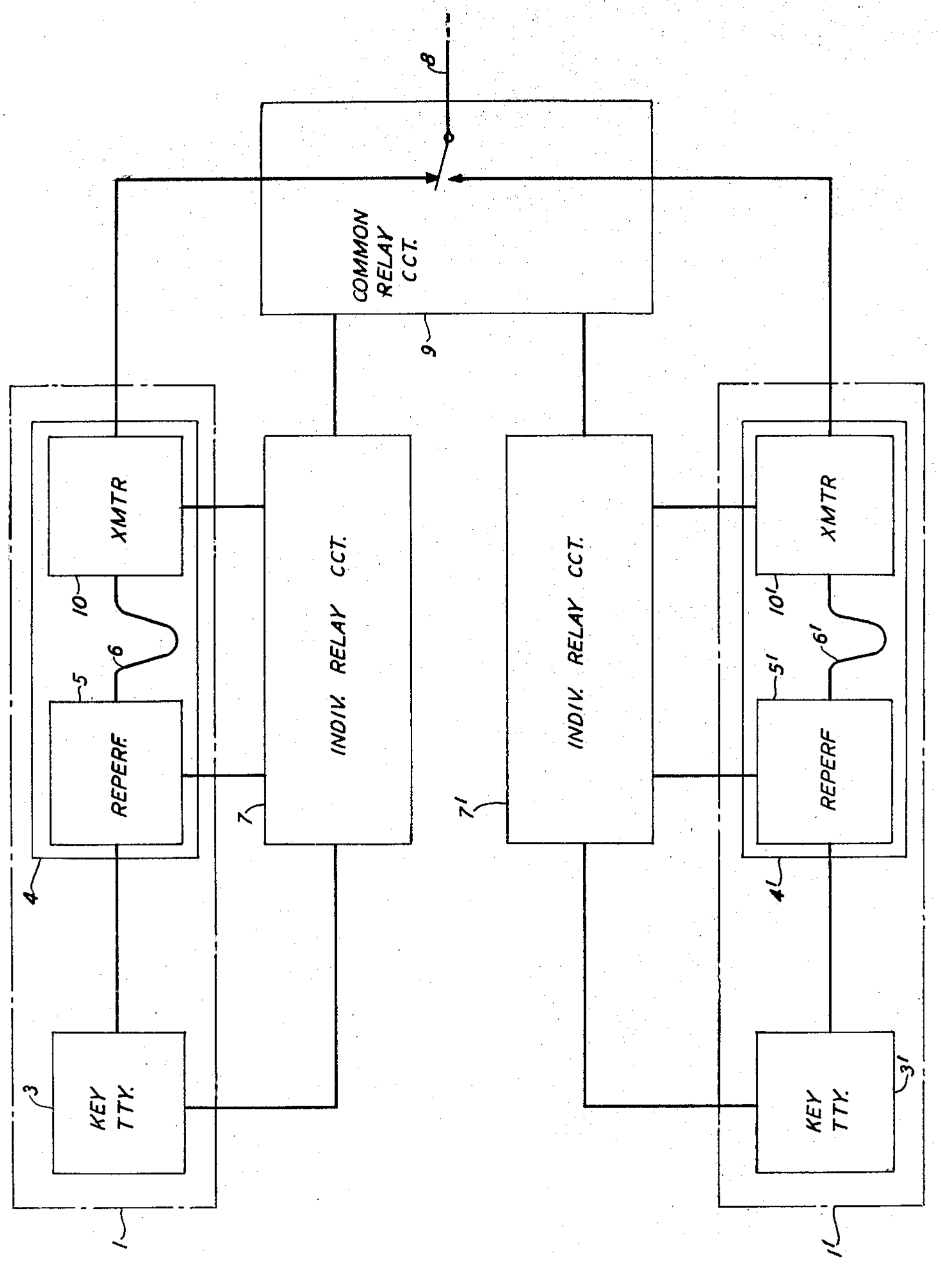
Fig. 10 shows, in block form, the manner in which the message-originating positions and the relay circuits cooperate.

In accordance with a preferred embodiment of the invention, a plurality of message-originating positions, two being the specific number disclosed herein, are shown in Fig. 10 as blocks 1 and 1'. The positions 1 and 1' are substantially identical, position 1 comprising a keyboard sending and receiving teletypewriter unit 3 and a reperforator-transmitter 4 having the reperforator portion 5 connected to the associated keyboard transmitter 3 to respond to all messages generated thereby. A circuit of relays 7 or 7' individual to each message-originating position registers, one after another up to a maximum of three, complete messages stored in the form of perforated tape 6 in the associated reperforator-transmitter 4, and also registers a bid for access to the outgoing channel 8. Another relay circuit 9, common to the two message-originating positions, gives their reperforator-transmitter units access alternately to the outgoing channel, except that when only one position has messages in storage awaiting transmission, those messages will be transmitted one after another in succession until all have been transmitted, or until the completion of storage of a message in the other reperforator-transmitter gives that unit a right of access to the outgoing channel.

The relay circuit 7 or 7' individual to a message-originating position includes three sets of relays, the sets being operable in succession in predetermined order as complete messages are placed in storage awaiting transmission. When all three sets of relays have been operated, the keyboard transmitter is thereby disabled, so that the recording of additional messages is prevented. Each time that a reperforator-transmitter, having gained access to the common outgoing channel, completes the transmission of the eldest message in storage, the last operated set of message registering relays is released, thereby requalifying the keyboard transmitter for operation to store an additional message. The message storing sets of relays are released in the inverse order of their operation as successive messages are transmitted from a message-originating position without the storing of additional messages, until a message-originating position no longer has messages in storage.

At a remote station where the messages transmitted from the two message-originating positions are received, break signal transmission means is provided for interrupting transmission whenever the message transmission is garbled, or for any other reason.

The common relay circuit responds to the break signal and immediately suspends operation of the transmitting portion 10 or 10′ of either reperforator-transmitter 4 or 4′ that is then in operation, or if neither is in operation, it precludes the starting of either one. With the break signal registered in the common circuit, either keyboard then in operation will be disabled upon the registering by its associated reperforator-transmitter of the end-of-message signal terminating the message. The break condition remains locked into the common circuit until it is released by manual operation of a break release key.

Figures 1, 2:
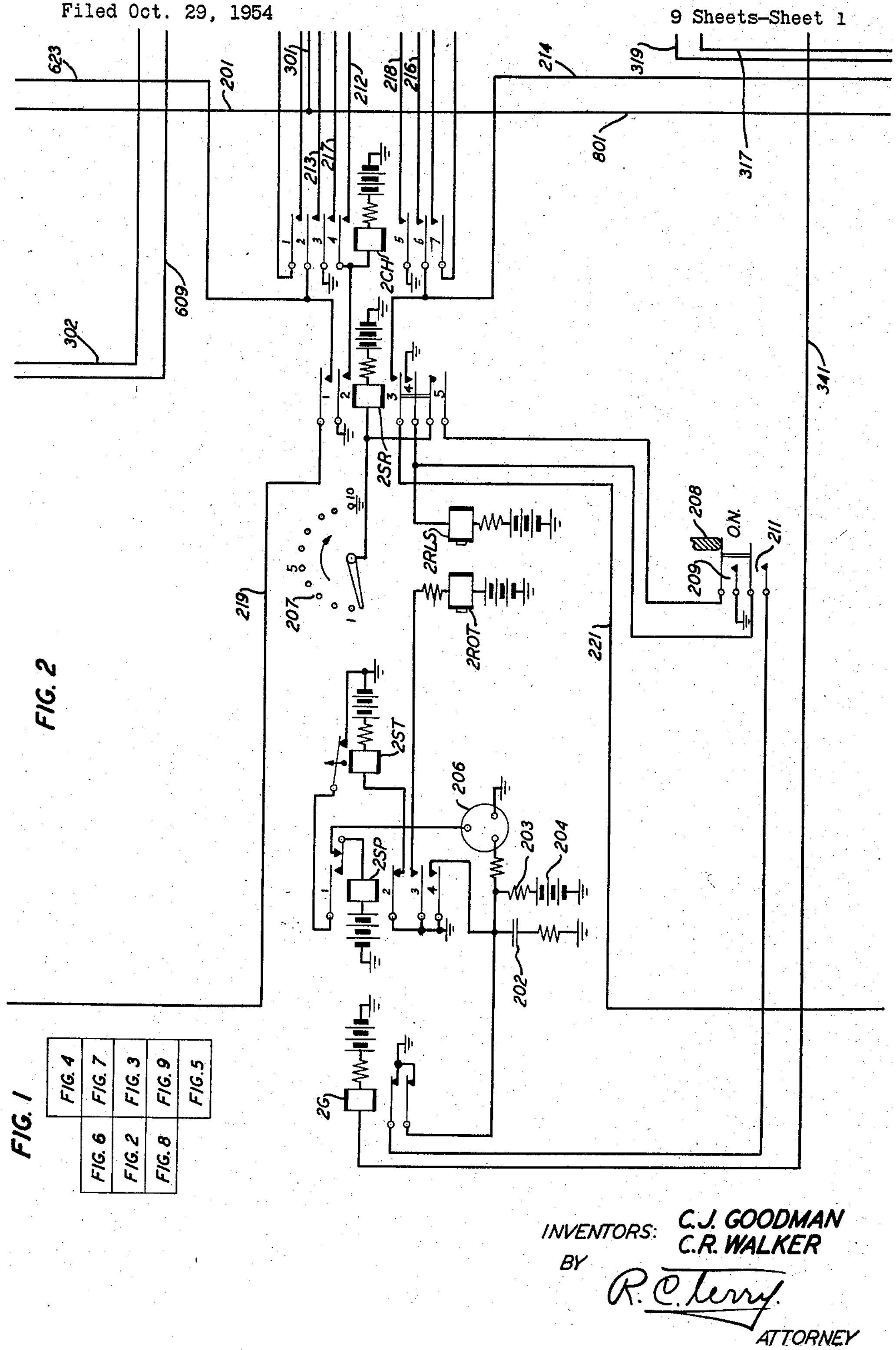
Fig. 1 is a diagrammatic showing of the manner in which Figs. 2 to 9, inclusive, are to be arranged to show a complete message transmission system for two originating positions.
Figure 3:
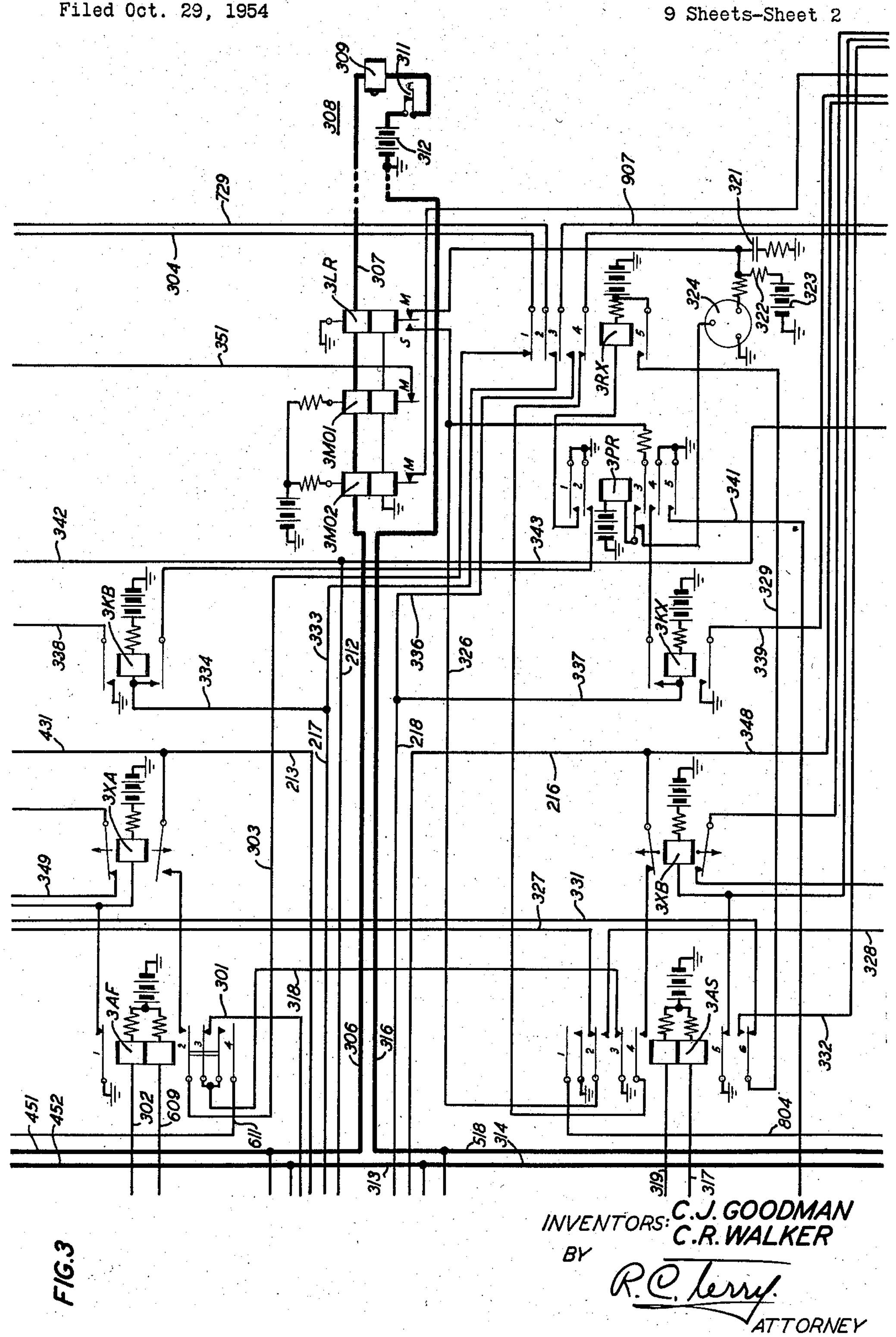
Figure 4:
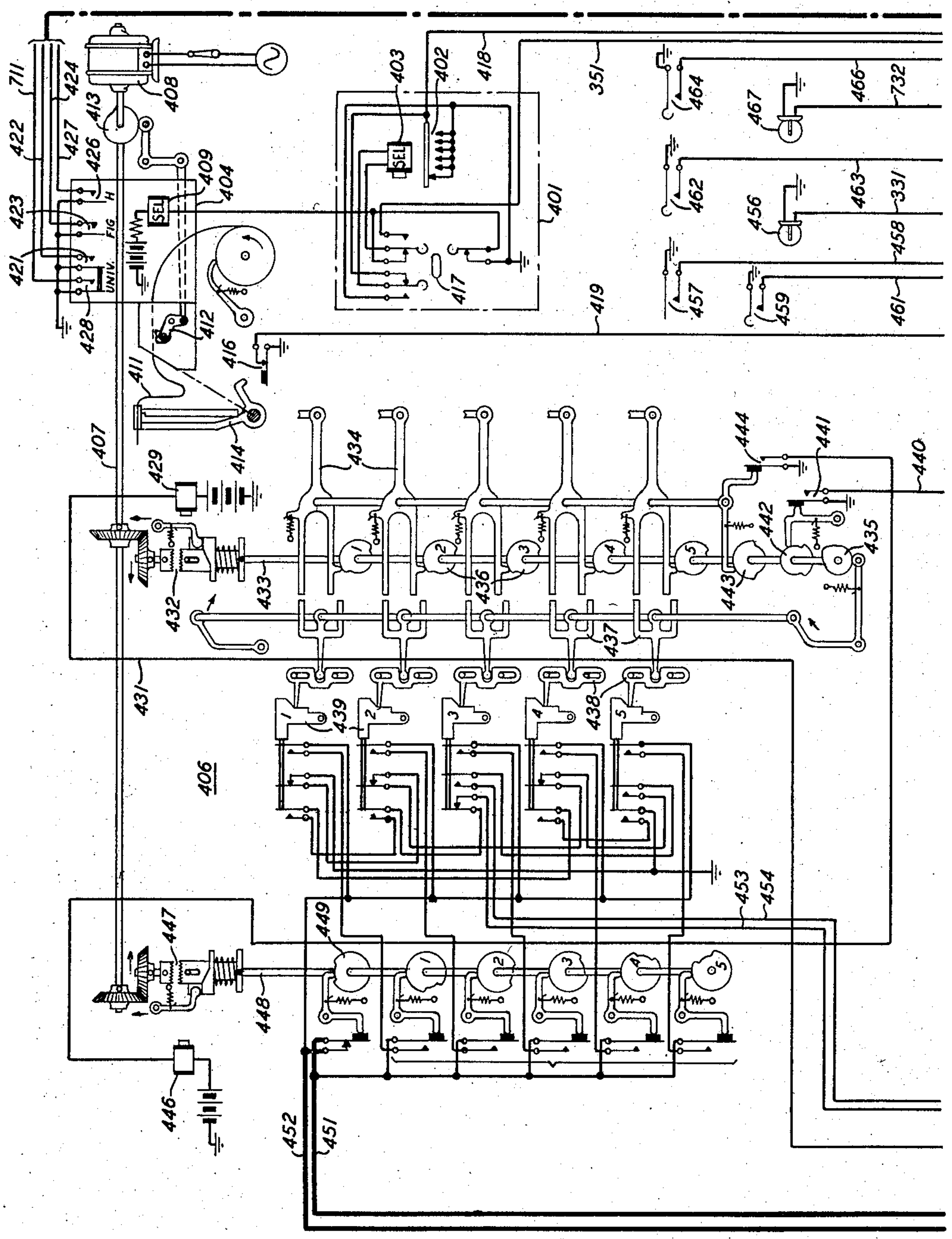
Figs. 4 and 5 show the two message-originating positions, including the keyboard sending and receiving teletypewriters and the reperforator-transmitters.
Figure 5:
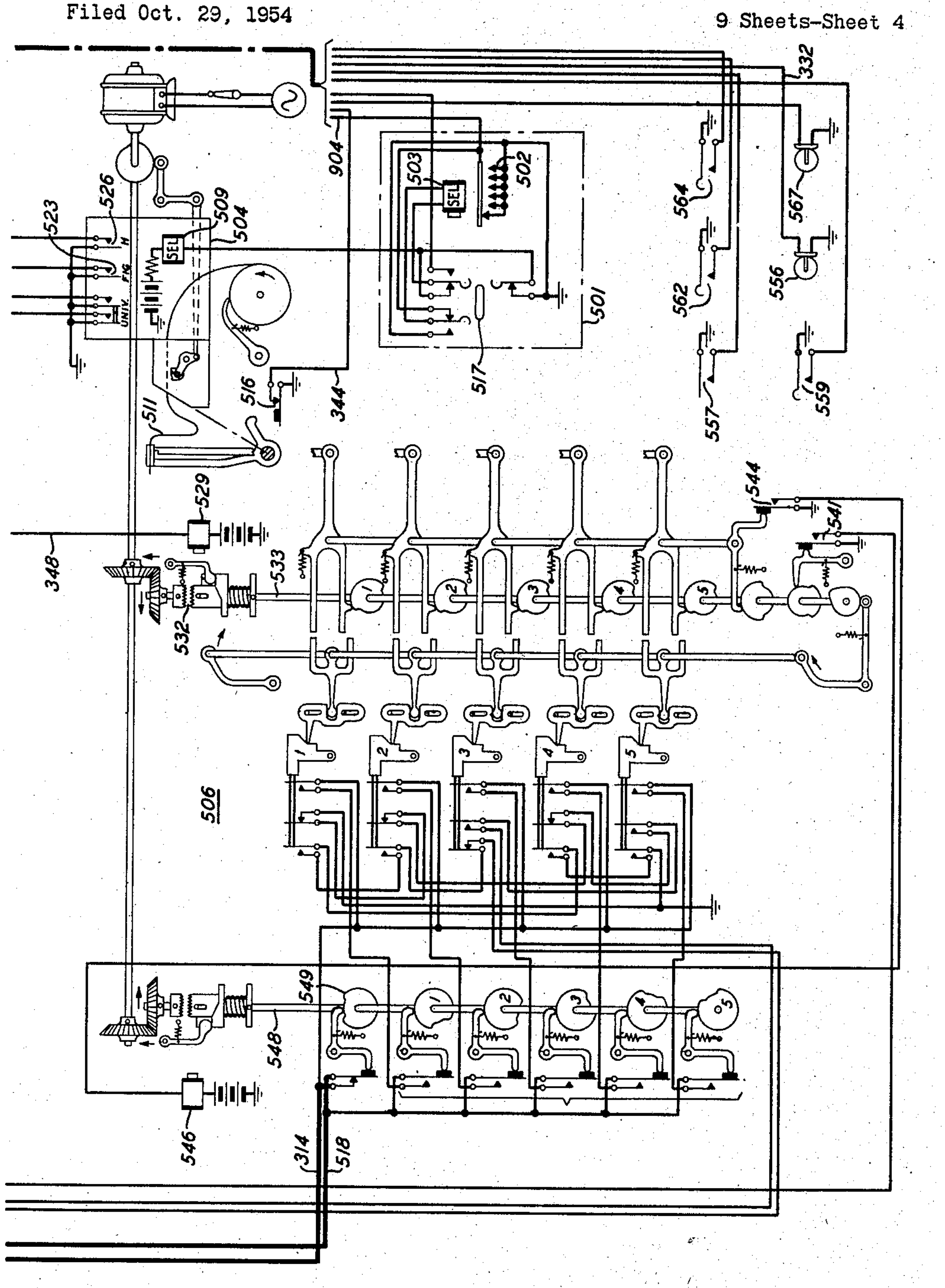
Figure 6:
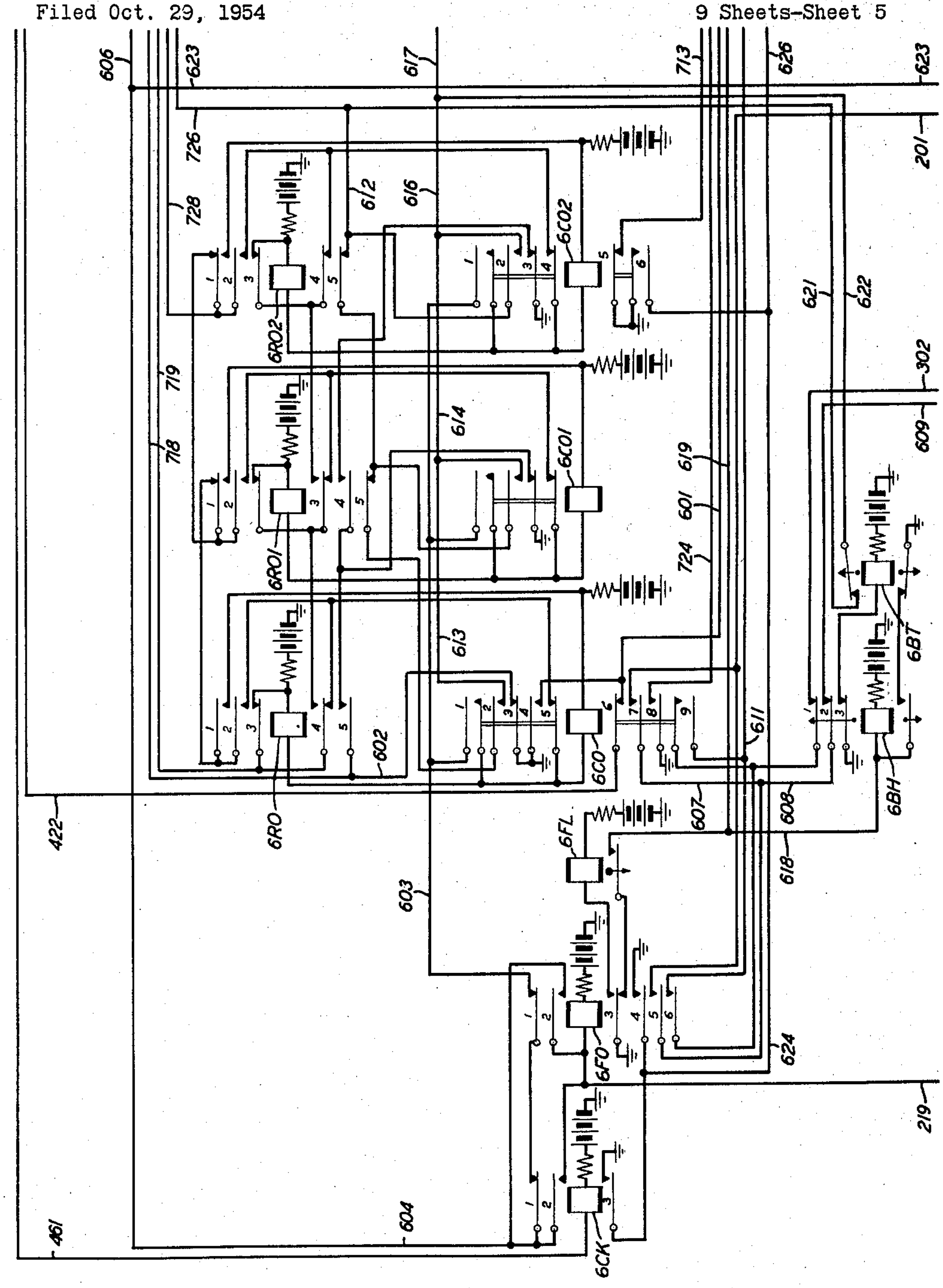
Figs. 6 and 7 show the relay circuits individual to the message-originating positions shown in Fig. 4.
Figure 8:
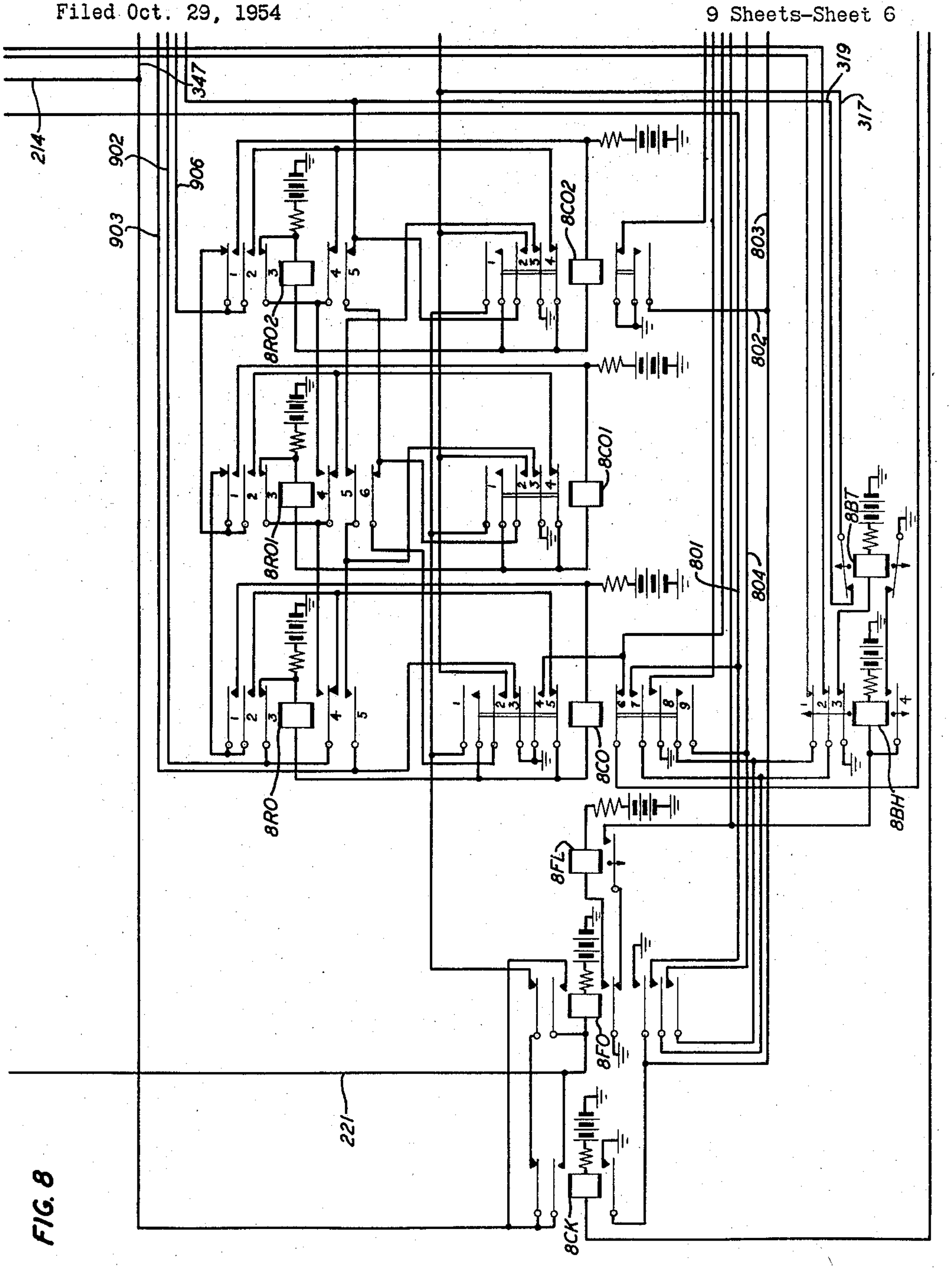
Figs. 8 and 9 show the relay circuits individual to the message-originating position shown in Fig. 5.
Figure 7:
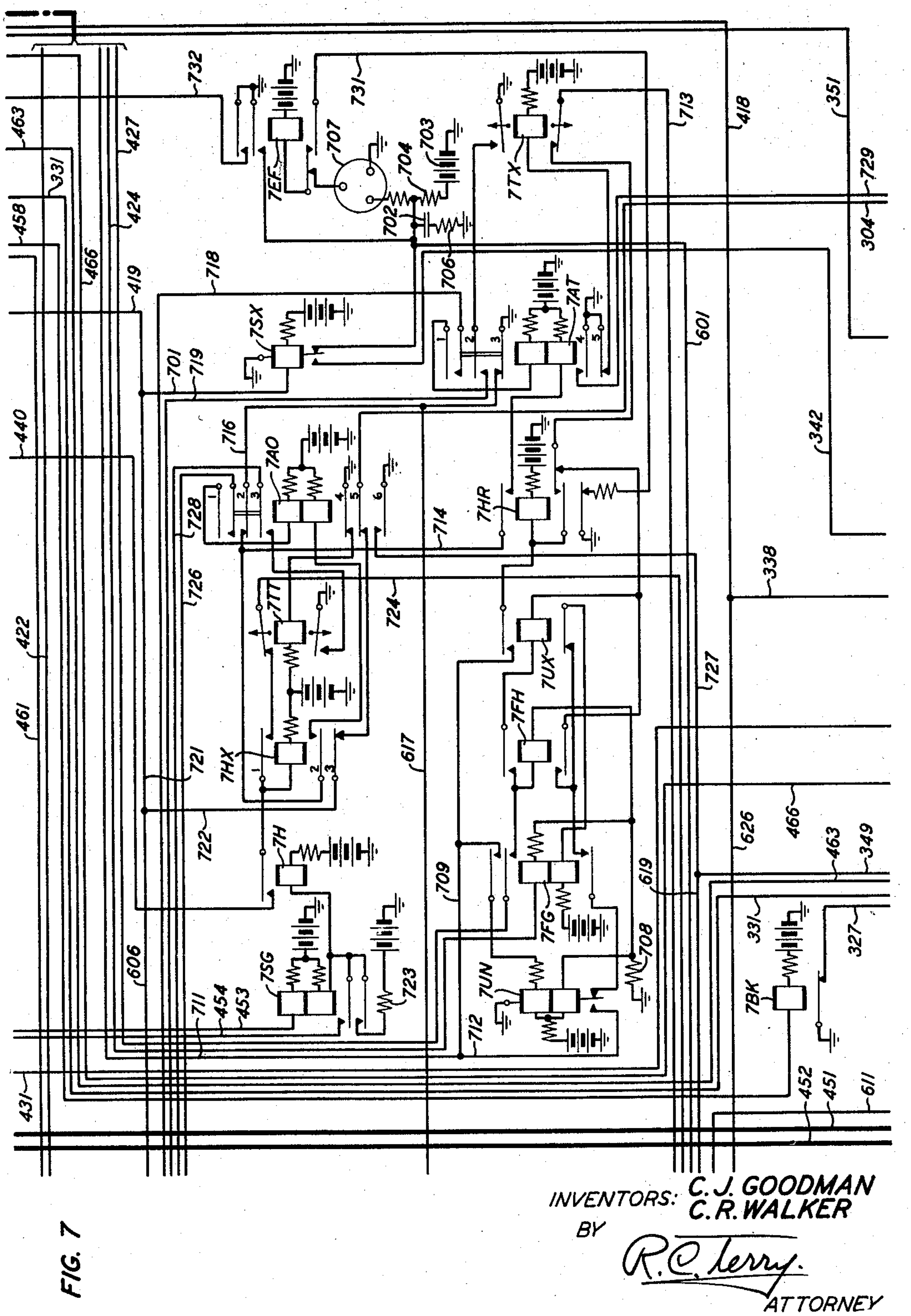
Figure 9:
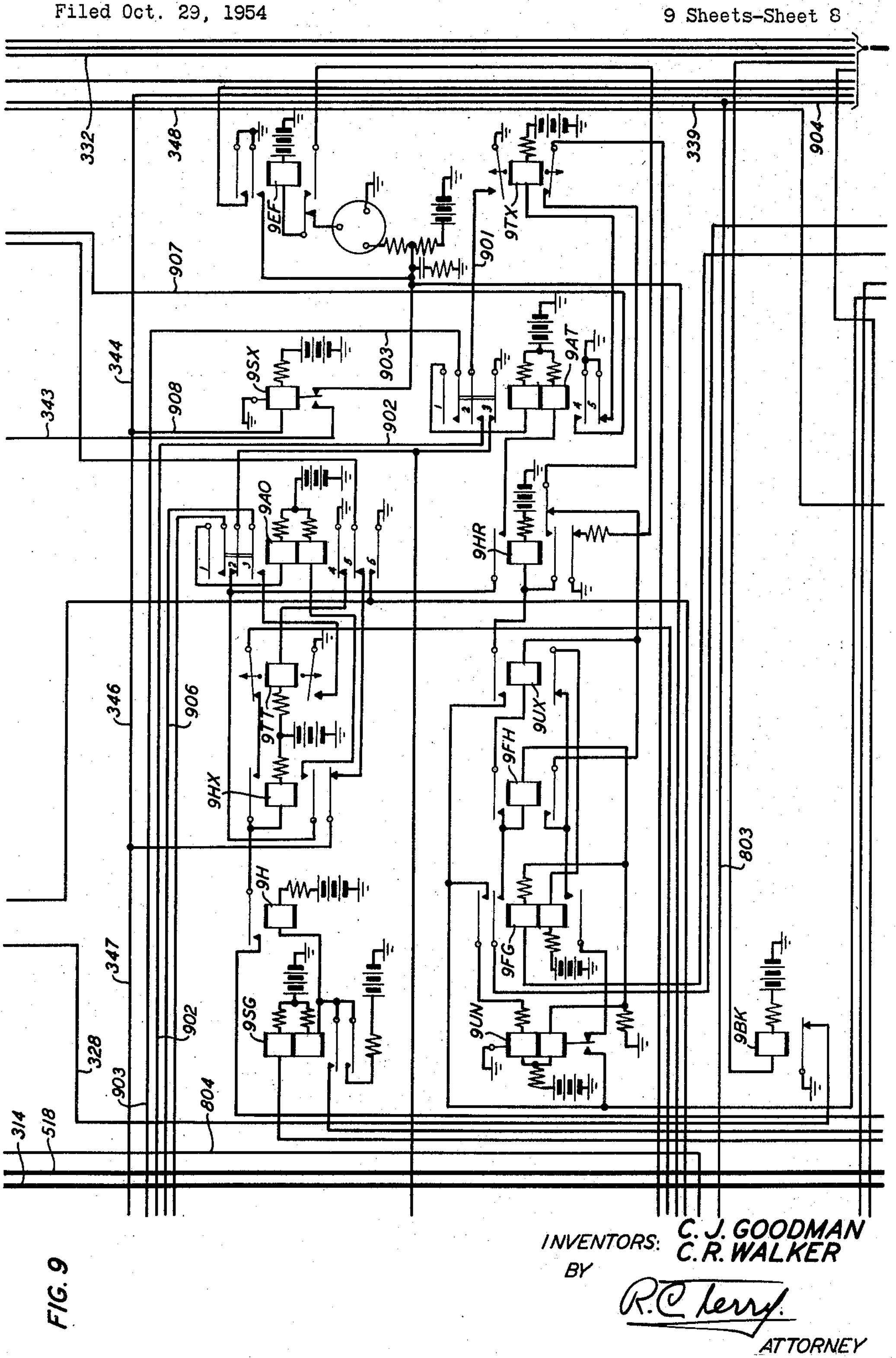

The designation of elements by reference numerals, in Figs. 1 to 9, inclusive, follows a plan in accordance with which the first digit of each reference numeral designates the figure of the drawings in which the element appears. Because of the fact that Fig. 5 is a substantial duplicate of Fig. 4, this specification will not include a complete and detailed description of Fig. 5, but certain elements thereof, whether or not referred to in the specification, have been designated by reference numerals corresponding to those in Fig. 4 but having, as the first digit, the numeral 5 instead of the numeral 4. Similarly, Figs. 8 and 9 substantially duplicate Figs. 6 and 7, and elements of Figs. 8 and 9 are identified by reference numerals corresponding to elements in Figs. 6 and 7, respectively. The above-described plan for allocating reference numerals does not apply to conductive paths or path segments, as conductors have merely been designated by reference numerals in the general numerical sequence of reference characters without any specific plan. In general, conductive path segments on opposite sides of junction points have been designated by different reference numerals in order that the paths may be followed in the drawings in the proper direction away from such junction points. Moreover, conductive paths or path segments have been identified by reference numerals having the first digit of the figure of the drawings wherein the tracing of the path or path segment is begun, and the same reference numeral is retained to the first junction point or to the end of the path, even though the path may enter or pass through one or more other figures of the drawings. As a result of this, certain reference numerals will appear on each figure of the drawings that do not have, as their first digits, the number of that figure of the drawings.

Referring now to the drawings, and specifically to Fig. 4, a reference numeral 401 designates a sending and receiving teletypewriter which may be of the type shown in Patent 1,904,164, granted April 18, 1933, to S. Morton et al. The disclosure of the Morton et al. patent is incorporated herein by reference as part of the present specification. Teletypewriter 401 comprises a keyboard transmitter mechanism, represented symbolically by transmitting contacts 402, and a selector magnet controlled printing mechanism represented symbolically by selector magnet 403.

As will presently be described, the keyboard transmitter of teletypewriter 401 is arranged to transmit to a reperforator-transmitter mechanism, which may be of the type shown in Gubisch Patent 2,348,214, granted May 9, 1944, the disclosure of which is incorporated herein by reference as part of the present specification. The reperforator-transmitter comprises a receiving and tape perforating portion, designated generally by the reference numeral 404, and a tape-sensing and transmitting portion designated generally by the reference numeral 406.

The signal-receiving, perforating, tape-sensing and retransmitting operations are accomplished by means of driving shaft 407 driven by motor 408. Signals are received by selector magnet 409 of reperforator 404, this selector magnet generally representing the entire selecting mechanism, and are perforated in tape 411 by perforating mechanism 412 driven by shaft 407 through cam 413.

A pivoted tape-sensing head 414, which is part of the transmitting mechanism 406, normally rests against reperforator 404 when there is no message material in tape 411 awaiting transmission. When the perforating mechanism perforates signals in tape 412, the pivoted tape-sensing head 414 is pushed away from the tape-sensing mechanism about the pivotal mounting of the tape-sensing head to permit the tape to form into a loop. When the formation of a loop of tape begins, the tape-sensing head 414 permits the closure of tape contacts 416 to complete a circuit which will be described hereinafter.

It will be assumed that an operator is about to prepare a message at the message-originating position shown in Fig. 4, which will be considered to be the first message-originating position. The operator conditions teletypewriter 401 for the transmission of signals by operating a three-position send-monitor key 417 to the sending position. Operation of the key to the send position results in the interruption of a normal energizing circuit for selector magnet 409 of reperforator 404, traced from battery, through the winding of magnet 409, the lower break contacts of key 417 to ground, and the substitution of an energizing circuit for the selector magnet, through the upper right-hand break contacts of key 417, selector magnet 403 of the teletypewriter, the upper left-hand break contacts of key 417 and the keyboard-controlled transmitting contacts 402 of the teletypewriter, to ground. It will be noted that a conductive path 418 extends from the common side of transmitting contacts 402 and, as will be described hereinafter, this path becomes grounded under certain conditions to disable the keyboard transmitter mechanism. When the circuits are conditioned to permit the transmission of signals by transmitter contacts 402, there is no ground at the remote end of conductor 418. It will also be observed that selector magnet 403 of the teletypewriter 401 has been placed in series with selector magnet 409 of reperforator 404 under the control of transmitting contacts 402. This arrangement permits the receiving portion of teletypewriter 401 to produce a home copy of the message that is perforated in tape 411.

The perforation of signals in tape 411 results in the closure of contacts 416, extending ground over conductors 419 and 701 to the winding of relay 7SX, which operates its armature from the right-hand to the left-hand contact. Relay 7SX disconnects ground from a timing circuit comprising condenser 702, battery 703, resistors 704 and 706, and gas tube 707. As long as the operator continues to prepare a tape, the tube 707, which is part of an alarm circuit, will not be permitted to fire because of the operation of the right-hand universal contacts 421 of reperforator 404, which close momentarily in each receiving cycle of reperforator 404, extending ground over conductor 422, break contacts 6 controlled by armature 9 of relay 6CO, conductor 601 to the same point of access to the timing circuit for tube 707 as the right-hand contact of relay 7SX. The relay 7SX completes no circuit at its left-hand contact at this time. At the end of the message being prepared at teletypewriter 401, the operator transmits a sequence of signals comprising the codes for "figures," "H" and "letters," representing an end-of-message signal. In response to the "figures" combination, contacts 423 of reperforator 404 close momentarily, connecting ground over conductor 424, upper winding of relay 7FG, to a potential divider circuit comprising a path through resistor 708 to ground, and a path through the lower winding of relay 7UN to battery. Relay 7FG operates in this path and provides a flow of current through the lower winding of relay 7UN to hold the armature of that relay in engagement with its right-hand contact. Relay 7FG locks from battery through its lower winding, lower armature and back contact of relay 7UX, lower armature and front contact of relay 7FG, and right-hand contact and armature of relay 7UN to ground.

In response to the code combination for the character "H," which follows the "figures" signal, contacts 426 of the reperforator 404 close momentarily, connecting ground over conductor 427, inner upper armature and front contact of relay 7FG, winding of relay 7FH, and to the same potential divider comprising paths through resistor 708 and the lower winding of relay 7UN. Relay 7FH operates, and the current through the lower winding of relay 7UN holds the armature in engagement with the right-hand contact. At the time of operation of relay 7FG, the circuit through the upper winding of relay 7UN was completed at the outer upper armature and front contact of relay 7FG, conductors 709 and 711, to the left-hand universal contacts 428 of reperforator 404. These contacts are closed in overlapping relation to contacts 423 and 426, and in the case of the former contacts, the current through the winding of relay 7FG and the lower winding of relay 7UN predominates over the current through the upper winding of relay 7UN to hold the armature of relay 7UN on its right-hand contact. The same is true when the lower winding of relay 7UN is energized in series with the winding of relay 7FH through contacts 426. However, when any character other than "H" follows the "figures" combination, as may happen in the text of a message, the closure of contacts 428, incident to response of reperforator 404 to the character other than "H," results in the energization of the upper winding of relay 7UN to disengage the armature from the right-hand contact and engage it with the left-hand contact where a locking circuit for the upper winding of relay 7UN is completed, through conductors 712 and 709, and the front contact and outer upper armature of relay 7FG. When this occurs, relay 7UN interrupts, at its right-hand contact, the locking circuit for relay 7FG, and relay 7UN returns its armature to the right-hand contact upon the interruption of its locking circuit at the outer upper armature of relay 7FG, but remains operated until relay 7FG has actually released. This is the manner in which the end-of-message signal is distinguished from other sequences of codes comprising the "figures" code and other codes.

Relay 7FH prepares, at its upper armature and front contact, a holding circuit for itself, through the winding of relay 7UX, break contacts controlled by the inner lower armature of relay 7HR, front contact and lower armature of relay 7TX, which is normally operated, conductor 713, and break contacts controlled by armature 6 of relay 6CO2 to ground. As soon as ground is disconnected from the energizing circuit for relay 7FH, upon the opening of contacts 426, this circuit becomes effective and relay 7UX operates and locks in series with relay 7FH.

Relay 7UX interrupts, at its lower armature and back contact, the locking circuit for relay 7FG, which releases, leaving relays 7FH and 7UX operated. In response to the next code combination received by selector magnet 409 of reperforator 404, which presumably would be a "letters" signal, universal contacts 428 close momentarily and extend ground over a previously-traced path including conductors 711 and 709, and through the upper armature and front contact of relay 7UX to the winding of relay 7HR, which operates.

At its inner lower armature, relay 7HR interrupts the previously-traced locking circuit for relays 7UX and 7FH, which relays release, and the relay 7HR completes, at that armature and front contact, a locking circuit for itself through the front contact and lower armature of relay 7TX and conductor 713 to the ground from which relay 7UX was operated. At its upper armature and front contact, the relay 7HR completes an energizing circuit for relay 7AT, traced from battery through the lower winding of that relay, the noted front contact and armature of relay 7HR, conductor 714, break contacts 2 controlled by armature 1 of relay 7AO, conductors 716 and 717, and break contacts 3 controlled by armature 1 of relay 7AT to ground. Relay 7AT locks through its upper winding, armature 1 and front contact, conductors 718 and 602, and the back contact and armature 3 of relay 6CO to ground. The subordination of the opening of break contacts 3 of relay 7AT to the engagement of armature 1 with its front contact, through which the locking circuit for relay 7AT is established, provides a sequence of operations in accordance with which the locking circuit of the relay is completed before the original energizing circuit is interrupted at break contacts 3. Were this not the case, a self-interrupting sequence, comparable with buzzer operation, might occur in the energizing circuit of relay 7AT.

At its armature 5 and back contact, the relay 7AT interrupts the energizing circuit of slow-release relay 7TX. Upon the release of the latter relay, the locking circuit of relay 7HR is interrupted, and that relay releases. At the upper armature and back contact of relay 7TX, a ground connection is extended through the make contacts 2 controlled by armature 1 of relay 7AT, conductor 719, armature 4 and back contact of relay 6RO, break contacts 5 controlled by armature 1 of relay 6CO and winding of that relay to battery, and the relay 6CO operates. Relay 6CO locks through its front contact and armature 1, conductor 603, back contact and armature 1 of relay 6FO, back contact and armature 1 of relay 6CK, conductors 604, 606, 721 and 419, and tape contacts 416 of tape transmitter-distributor 406 to ground. Relay 6CO interrupts that locking circuit for relay 7AT, which releases. With relay 7AT released, a ground connection, that was extended over conductor 719 and through armature 3 and back contact of relay 6RO to the point of connection of battery to the winding thereof, is removed, and the relay 6RO operates in a path from its winding through the front contact and armature 1 of relay 6CO, now operated, and then over a path previously traced to ground, through the tape contacts 416, this path being the one over which relay 6CO is locked. At this time the relay 6RO prepares certain circuits, which will be described hereinafter as they are completed by other relays. At the time of release of relay 7AT by relay 6CO, relay 7TX reoperates through the back contact and armature 5 of relay 7AT.

With relay 6CO operated, as previously stated, an energizing circuit for relay 3AF is completed, the circuit being traced from ground through the break contacts 3 controlled by armature 1 of relay 3AS, which is assumed to be unoperated, conductor 318, break contacts 3 controlled by armature 4 of relay 3AF, conductors 301 and 201, make contacts 7 controlled by armature 9 of relay 6CO, conductors 607 and 608, armature 2 and back contact of relay 6BH, conductor 609, and lower winding of relay 3AF to battery, and that relay operates. Relay 3AF locks in a circuit from battery through its upper winding, conductor 302, back contact and armature 1 of relay 6BH, front contact and armature 9 of relay 6CO, conductor 611, armature 4 and front contact of relay 3AF conductor 318 and break contacts 3 controlled by armature 1 of relay 3AS to ground.

At its armature 1 and back contact, the relay 3AF interrupts the energizing circuit for relay 3XA, which is a slow-release relay. That relay, upon releasing, completes a circuit for transmitter clutch magnet 429 of the transmitter 406, in a circuit from battery, through the winding of that magnet, conductor 431, lower armature and front contact of relay 3XA, make contacts 2 controlled by armature 4 of relay 3AF, conductor 303, back contact and armature 1 of relay 3RX, conductor 304, armature 5 and back contact of relay 7AO, back contact and armature 3 of relay 7HX, and conductors 722, 721 and 419 to ground, through tape-controlled contacts 416.

As is fully disclosed in the hereinbefore identified patent to Gubisch, the transmitter clutch magnet 429, upon being energized, trips clutch 432 for driving the shaft 433. Shaft 433 carries cams 436 which cause the perforations in tape 411 to be sensed by sensing levers 434, and through transfer cam 435, it causes transfer levers 437 to test the setting of the sensing levers 434 and to position slide members 438 in accordance with the signal conditions, the slide members being shifted to their uppermost positions for a marking condition and to their lowermost positions for a spacing condition. The slide members 438 in turn control contact operating members 439, camming those members leftwardly for a marking condition and leaving them presented rightwardly for a spacing condition. After the shaft 433 has rotated through part of a revolution, transmitter auxiliary contacts 441 are closed by cam 442 to complete an energizing circuit for relay 7HX after relay 7H has been operated, as will be described subsequently. Cam 443 on shaft 433 also closes contacts 444 which complete the circuit of distributor clutch magnet 446, energizing it, and permitting clutch 447 to become engaged to drive the distributor shaft 448.

Of the sets of contacts controlled by the contact operating levers 439, the pair of make contacts at the right of each set is employed as transmitting contacts, being open for a spacing element and closed for a marking element. The remaining sets of contacts are so arranged and related, and certain ones thereof interconnected, that for the code combinational settings of contact operating members 439, representing the code combinations for "figures" and "H," a ground connection will be extended into the relay circuit in Fig. 7.

In the idle condition of distributor shaft 448, a steady marking condition is imposed upon the outgoing transmission channel by the contacts controlled by cam 449. One of the paths that extends from these normally closed contacts is designated 451, and is traced from the contacts to conductor 306, upper windings of relays 3MO2, 3MO1 and 3LR, and thence over line conductor 307 to the remote station 308, to which messages are transmitted from the message-originating positions in Figs. 4 and 5. At the remote station 308, the conductive path extends through a signal responsive device designated 309, which may be a line relay or a selector magnet of a teletypewriter printer, the path perhaps including other signal responsive elements and control elements, including a break key 311, and terminating at one terminal of battery 312. The path from the other of the normally closed contacts controlled by cam 449 is traced over conductors 452, 313 and 314, normally closed contacts of transmitter 506 controlled by cam 549, which corresponds to cam 449 of the transmitter in Fig. 4, and conductor 518 to conductor 316, which is the other line conductor and extends to remote station 308 where it is grounded. Upon the opening of the contacts controlled by cam 449 as shaft 448 begins to rotate, the start element of the first code combination of the message will be transmitted, and the signal responsive element 309 at the remote station 308 will be released. As the distributor contacts controlled by the other five cams of shaft 448 are closed in succession, conductors 451 and 452 will be interconnected, provided the corresponding pair of signal transmitting contacts controlled by one of the levers 439 is closed, to generate a marking element. Spacing elements will be generated for any of the latter contacts that are open.

Each time the contact operating members 439 are set in accordance with the "figures" code combination, all five pairs of extreme left-hand contacts controlled thereby will be closed, and a path will be extended from ground over conductor 453, to the upper winding of relay 7SG which operates. At its outer armature, the relay 7SG connects resistor 423 in parallel with its lower winding to impart a slow-release characteristic to the relay, and at its inner armature, it prepares an energizing circuit for relay 7H. If any other character signal than the signal for "H" follows the "figures" signal, as would be the case anywhere in the body of a message, the circuit of relay 7SG would be interrupted, incident to the setting of levers 439 in accordance with the next code combination, and relay 7SG will release slowly. If the next code combination represents the character "H," which is the second code combination of the end-of-message signal, ground will be connected over a path completed through the middle set of contacts controlled by levers 439 to conductor 454, immediately after the path through the upper winding of relay 7SG is interrupted, and the ground will be extended through the front contact and inner armature of relay 7SG to hold that relay operated through its lower winding, and to operate relay 7H, the slow-release characteristic imparted by resistor 723 bridging the interval during which the circuits of both windings of relay 7SG are interrupted.

With relay 7H operated, and upon the closure of transmitter auxiliary contacts 441 in the cycle of shaft 433 in which the transfer of the next code combination to levers 439, presumably a "letters" code combination, occurs, the relay 7HX will operate in a path from ground through contacts 441, conductor 440, front contact and armature of relay 7H and winding of relay 7HX to battery, and will lock through its armature 1 and front contact, the front contact and upper armature of relay 7TT which is normally operated, conductor 724 and make contacts 8 controlled by armature 9 of relay 6CO to ground. The transfer of the "letters" code combination to contact control levers 439 results in the opening of the circuits for relays 7SG and 7H. At its armature 3 and back contact, the relay 7HX interrupts the energizing circuit for transmitter clutch magnet 429, causing shaft 443 to be arrested after transferring the "letters" code combination. Shaft 433 comes to rest with contacts 444 open, causing the release of distributor clutch magnet 446 after the transmission of the "letters" signal. At its armature 2, the relay 7HX completes the circuit of relay 7AO, the path being traced from battery through the lower winding of that relay, the noted front contact and armature of relay 7HX, break contacts 2 controlled by armature 1 of relay 7AO, conductors 716 and 717, and break contacts 3 controlled by armature 1 of relay 7AT. Relay 7AO operates over this circuit and locks through its upper winding, armature 1 and front contact, conductors 726 and 612, back contact and armature 5 of relay 6RO2, back contact and armature 5 of relay 6RO1, make contacts 2 controlled by armature 1 of relay 6CO, conductors 613, 614, 616, 617 and 717 to ground, through the break contacts 3 controlled by armature 1 of relay 7AT.

Relay 7AO completes an energizing circuit for relay 6BH, traced from battery through the winding of the latter relay, conductors 618, 619 and 727, front contact and armature 6 of relay 7AO to ground. Relay 6BH locks through its lower armature and front contact, and the front contact and lower armature of normally operated relay 6BT.

Another operation performed by relay 7AO is the interruption, at its armature 4 and back contact, of the energizing circuit for relay 7TT, which is a slow-release relay. Relay 7TT interrupts the locking circuit for relay 7HX which releases, thereby restoring the path for energizing transmitter clutch magnet 429. It will be assumed for the present that only a single message has been stored in tape 411, and with the sensing of the last code combination and the tape contacts 416 open, there is no circuit for reoperation of transmitter clutch magnet 429 when relay 7HX releases. At its lower armature and back contact, the relay 7TT extends a ground connection over make contacts 3 controlled by armature 1 of relay 7AO, conductor 728, armature 1 and back contact of relay 6RO2, armature 1 and back contact of relay 6RO1, armature 1 and front contact of relay 6RO to the right-hand terminal of relay 6CO, shunting the winding of the latter relay, and releasing it.

In the meantime, relay 6BH, at its armature 3 and back contact, has interrupted the energizing circuit of normally operated relay 6BT which starts to release, but has a slow-release characteristic. Relay 6BH also interrupts, at its armature 1 and back contact, the locking circuit for relay 3AF which releases. Relay 3AF completes the energizing circuit for relay 3XA which reoperates. At its upper armature and front contact, relay 6BT interrupts a path from conductor 726 to conductor 617, over conductors 621 and 622, paralleling the path from conductor 726, through the back contacts and armatures 5 of relays 6RO2 and 6RO1, the make contacts 2 controlled by armature 1 of relay 6CO, and conductors 613, 614 and 616 to conductor 617, this being part of the locking circuit for relay 7AO, thus assuring that relay 7AO shall not be unlocked until relays 6CO and 6BT have released. At its lower armature and front contact, relay 6BT interrupts the locking circuit for relay 6BH to permit the release of the latter relay when relay 7AO releases, the relay 6BH having been operated by the relay 7AO.

With relay 6CO shunted down by relay 7TT, as previously stated, the other locking path for relay 7AO is interrupted, and that relay releases. After the release of relay 6CO, and while relay 7AO is still operated, or is in the process of releasing, the relay 6CO provides a circuit for holding relay 6RO operated, traced from battery through the winding of the latter relay, armature 5 and back contact of relay 6CO, front contact and armaure 2 of relay 6RO, back contact and armature 1 of rely 6RO1, back contact and armature 1 of relay 6RO2, conductor 728, make contacts 3 controlled by armature 1 of relay 7AO, and the back contact and lower armature of relay 7TT to ground. When relay 7AO releases, it interrupts the circuit just traced for holding relay 6RO operated, and that relay releases. The relay 7AO also reestablishes the energizing circuit for relay 7TT which reoperates. With relay 7AO released, the circuit of relay 6BH is interrupted, and that relay releases, having a slow-release characteristic. Upon its release, it reestablishes the energizing circuit for relay 6BT whch reoperates.

It will now be assumed that while the message is being transmitted from tape 411, transmitting contacts 502 of keyboard sending and receiving teletypewriter 501 are operated to transmit a message to selector magnet 509 of reperforator-transmitter 504 for recording on tape 511, key 517 having been operated to the lower or Send position. It will also be assumed that the end-of-message signal has been received by selector magnet 509, that contacts 523 have closed momentarily in response to the "figures" code combination to effect the operation and locking of relay 9FG, and that contacts 526 have closed in response to the "H" signal to effect the operation and locking of relay 9FH. The operation of relay 9FH initiates a sequence of relay operations, the circuits of which will not be traced, which parallel operations hereinbefore described with reference to Figs. 4, 6 and 7, including the operation and locking of relay 9UX, the release of relay 9FG, the operation and locking of relay 9HR, the release of relays 9FH and 9UX, the operation and locking of relay 9AT, and the release of relay 9TX, which has a slow-release characteristic, the release of relay 9HR and operation of relay 8CO, the release of relay 9AT, the reoperation of relay 9TX, and the operation of relay 8RO.

It was stated previously that upon the operation of relay 6RO, the relay 3AF operated. Correspondingly, the relay 8RO seeks to complete an energizing circuit for the lower winding of relay 3AS. The circuit is traced from battery through the lower winding, conductor 317, back contact and armature 2 of relay 8BH, make contacts 7 controlled by armature 9 of relay 8CO, conductors 801 and 301 to the break contacts 3 controlled by armature 4 of relay 3AF. This relay is now operated so that the path is interrupted at the noted break contacts, and the circuit of relay 3AS cannot be completed until relay 3AF releases at the end of transmission of the message then being transmitted from tape 411. It will be apparent from this that relays 3AF and 3AS pertain to initiation of transmission of messages from the respective message-originating positions in Figs. 4 and 5 and are mutually exclusve, either one, being energized, precluding the operation of the other.

It will now be assumed that while the message is being transmitted from tape 411, a second message is recorded in tape 511 for retransmission. The end-of-message signals, following the second message, upon being received by selector magnet 509, operate contacts 523 and 526 in succession which causes a repetition of the sequence of relay operations previously described, namely the operation and locking of relays 9FG and 9FH in succession, the operation and locking of relay 9UX, the release of relay 9FG, the operation and locking of relay 9HR, the release of relays 9UX ann 9FH, the operation and locking of the relay 9AT, and the release of relay 9TX. The latter relay has a slow-release characteristic, and upon releasing, it extends a ground connection over conductor 901, make contacts 2 controlled by armature 1 by relay 9AT, conductor 902, armature 4 and front contact of relay 8RO which is operated, armature 4 and back contact of relay 8RO1, break contacts 4 controlled by armature 1 of relay 8CO1 and winding of that relay to battery, and relay 8CO1 operates. When relay 8RO operated, it extended the locking circuit for relay 9AT, which is traced over conductor 903 from the armature 1 and front contact of the latter relay, through the armature 5 and front contact of relay 8RO, and through break contacts 3 controlled by armature 1 of relay 8CO1 to ground. Relay 8CO1, upon being energized, interrupts that locking path so that the relay 9AT releases and removes a shunting ground connection from the winding of relay 8RO1, and that relay operates to the locking ground for relay 8CO1. Relay 3AS still cannot operate because it is assumed that transmission of the message from tape 411 is continuing.

It will now be assumed that before the end of transmission of the message from tape 411, the recording of a third message in tape 511 is completed. Contacts 523 and 526 close in succession and again initiate the sequence of operations, including the operation and locking of relay 9FG, the operation and locking of relay 9FH, the operation and locking of relay 9UX, the release of relay 9FG, the operation and locking of relay 9HR, the release of relays 9FH and 9UX, the operation and locking of relay 9AT, and the release of relay 9TX. With the latter relay released, ground is connected over conductor 901, make contacts 2 controlled by armature 1 of relay 9AT, conductor 902, armature 4 and front contact of relay 8RO, armature 4 and front contact of relay 8RO1, armature 4 and back contact of relay 8RO2, break contacts 4 controlled by armature 1 of relay 8CO2, and winding of that relay to battery. Relay 8CO2 locks through its front contact and armature 1 to the locking circuit for relays 8CO and 8CO1 and releases relay 9AT which, removing the shunting ground around relay 8RO2 through the armature 3 and back contact of that relay, permits the relay to operate on the holding circuit for relay 8CO2, through the armature 1 and front contact of the latter relay.

With relay 8CO2 operated, ground is extended through its front contact and armature 6, conductors 802, 803 and 904 to the common side of keyboard transmitter contacts 502, thereby, in effect, shunting out the keyboard transmitter contacts and providing a steady energizing circuit for selector magnet 503 of teletypewriter 501, and for selector magnet 509 of reperforator 504. Both magnets will remain steadily energized, and the keyboard transmitter will be ineffective to record any further messages.

It will now be assumed that the transmission of the message from tape 411, that has been in progress while three messages have been recorded in tape 511, is completed, and that relay 3AF releases. It will further be supposed that during the recording of the three messages in tape 511, another message was recorded in tape 411, immediately following the one that is being transmitted. Relays 6CO and 6RO remain operated throughout the transmission of the message for the recording of which they were operated, so that when the relays 7FG, 7FH, 7UX, 7HR, 7AT and 7TX go through their sequence in connection with the recording of the second message in tape 411, relays 6CO1 and 6RO1 operate and lock. Accordingly, at the instant of release of relay 3AF in response to the "figures," "H" and "letters" signals at the end of the first message in tape 411, an energizing circuit for relay 3AS, previously traced through its lower winding and over conductor 317, back contact and armature 2 of relay 8BH, make contacts 7 controlled by armature 9 of relay 8CO, conductors 801 and 301, break contacts 3 controlled by armature 4 of relay 3AF, conductor 318, and break contacts 3 controlled by armature 1 of relay 3AS, is completed. Relay 3AF cannot reoperate without giving the relay 3AS an opportunity to operate because, as previously stated, the relay 6BH operates and locks, and causes the release of relay 3AF by interrupting its locking circuit at the armature 1 and back contact of relay 6BH, the latter relay interrupting the energizing circuit for the lower winding of relay 3AF at its armature 2 and back contact.

Relay 3AS locks through its upper winding, conductor 319, back contact and armature 1 of relay 8BH, front contact and armature 9 of relay 8CO, conductor 804, and armature 1 and front contact of relay 3AS to ground. The sequence of operations that follows corresponds to the sequence previously described with respect to the message-originating position in Fig. 4, and will be described only generally, without the tracing of circuits. It includes the release of slow-release relay 3XB, which completes the energizing circuit for transmitter magnet 529. Distributor shaft 533 is driven through clutch 532 with magnet 529 operated, and in each revolution of the shaft 533, distributor magnet contacts 544 close and complete the circuit of distributor clutch magnet 546. The transmission of the message proceeds, and when the "figures," "H" and "letters" codes at the end of the message are transmitted, the relay 9SG operates, and thereafter the relay 9H operates. When the transmitter auxiliary contacts 541 close in connection with the transmission of the "letters" signal, the circuit of relay 9HX is completed, and that relay operates and locks. It releases the relays 9SG and 9H, and the circuit of transmitter clutch magnet 529 is interrupted, and that magnet releases, suspending transmission. Relay 9AO operates under the control of relay 9HX and releases relay 9TT which has a slow-release characteristic, and operates relay 8BH. Relay 8BH releases relay 3AS which reoperates relay 3XB. Relay 8BH also releases relay 8BT which has a slow-release characteristic.

Upon the release of relay 9TT, a circuit is extended through its lower armature and back contact, make contacts 3 controlled by armature 1 of relay 9AO, conductor 906, armature 1 and front contact of relay 8RO2, to the battery terminal of relay 8CO2, thereby shunting the winding of that relay, in the manner previously described with reference to relay 6CO, and releasing the relay 8CO2. Relay 8CO2 releases relay 9AO which reoperates relay 9TT and releases relays 8RO2 and 8BH, the latter reoperating relay 8BT.

The release of relay 3AS, in the above-described sequence of operations, permits the reoperation of the relay 3AF to initiate the transmission of the message assumed to have been placed in storage in tape 411 while the first message was being transmitted. Relay 8BH, which caused the release of relay 3AS, prevents its immediate reoperation along with the relay 3AF. In Fig. 8, relays 8RO2 and 8CO2 have been released, indicating that one of the three messages previously in storage has been transmitted. The relays 8CO1 and 8RO1 and the relays 8CO and 8RO remain operated, indicating that the tape 511 contains two messages awaiting transmission. With relay 8CO2 released, the shunt around transmitting contacts 502 is removed, thereby qualifying the keyboard transmitter to be operated to store another message.

It will now be assumed that while the second message is being transmitted from tape 411, at which time the relays 6CO and 6RO, but not the relays 6CO1 and 6RO1 or the relays 6CO2 and 6RO2 are operated, the remote station, at which the second message in tape 411 is being received, transmits a break signal. One of the reasons for the transmission of such a signal might be that, due to some trouble in the system or to disturbances on the line, the message is not being correctly received. The break signal is transmitted by the operation of break key 311 which opens the previously-described transmission circuit, causing relays 3MO1, 3MO2 and 3LR to operate from their marking to their spacing conditions. Relay 3LR interrupts, at its marking contact, the ground which is holding condenser 321 of a timing circuit, including resistor 322, battery 323 and the gas tube 324, inactive. Condenser 321 begins to charge through resistor 322. Presumably, the attendant at the remote station 308 will hold break key 311 operated for a sufficient interval for the timing circuit to time out and for tube 324 to fire. Relay 3PR has its winding included in the anode circuit of tube 324, the path including break contacts controlled in make-before-break manner by armature 3 of relay 3PR, so that when tube 324 fires, the relay 3PR operates, and locks through its front contact and armature 3 to the spacing contact and armature of relay 3LR, an additional locking path extending over conductor 326, transfer contacts 2 controlled by armature 1 of relay 3AS, to the back contact and grounded armature of relay 7BK, over conductor 327, if relay 3AS is released, and over conductor 328, and the back contact and armature of relay 9BK, if relay 3AS is operated. The ground connection supplied from the armature of relay 3LR, during the interval that it engages the spacing contact, provides for the locking of relay 3PR independently of the other locking path so that, in the event that a line failure rather than a break signal has driven relay 3LR to spacing, relay 3PR cannot be released by interruption of the other locking path under manual control. It will be apparent that relay 3LR follows all signals transmitted from either of the message-originating positions to the remote station 308, but such excursions to spacing, in response to the spacing elements of code combinations, do not permit tube 324 to fire as it is timed to respond only to a long spacing condition having a duration longer than the spacing intervals occurring in normal telegraph signals.

At its armature 1 and front contact, relay 3PR completes the circuit of relay 3RX which operates. At its armature 5, the relay 3RX extends a battery connection over conductor 329 to armature 6 of relay 3AS, and if that relay is released, as it would be under the assumed condition that transmission is proceeding from tape 411, the path will be continued over the back contact, conductor 331, to light break lamp 456, or over the front contact of relay 3AS, if operated, conductor 332, to break lamp 556. At its armatures 1 and 4, the relay 3RX interrupts the energizing circuits for transmitter clutch magnets 429 and 529, respectively, and since it has been assumed that the second message is being transmitted from tape 411, the magnet 429 will have its energizing circuit effectively interrupted, and the magnet will release to suspend transmission. Two other circuits are prepared by relay 3RX, one at the front contact associated with armature 2 and extending over conductors 333 and 334 to the winding of relay 3KB, and the other extending from the front contact associated with armature 3, over conductors 336 and 337 to the winding of relay 3KX. These paths pertain to the operation of the keyboard transmitters and the teletypewriters 401 and 501 in relation to the reception of the break signal. Either or both of those transmitters may have been in operation for the recording of messages in tapes 411 and 511 at the time of reception of the break signal. Assuming that the recording of a message in tape 411 is completed first, the relays 7FG, 7FH, 7UX, 7HR and 7AT will operate in the sequence and manner hereinbefore described. Relay 7AT extends a ground connection through its armature 4 and front contact, and over conductor 729, to armature 2 of relay 3RX, through the front contact associated therewith, and over conductors 333 and 334 to operate relay 3KB. This relay locks through its lower armature and front contact, and through the front contact and armature 2 of relay 3PR to ground. At its upper armature, the relay 3KB extends ground over conductors 338 and 418 to keyboard control transmitter contacts 402 to shunt those contacts and prevent the transmission of further messages to reperforator 404. Similarly, if relay 9AT operates in response to the recording of the end-of-message signal in tape 511, ground will be extended through the armature 4 and front contact, and over conductor 907, armature 3 and front contact of relay 3RX, and conductors 336 and 337, to operate relay 3KX. This relay locks to the grounded armature 4 of relay 3PR, and extends ground over conductors 339 and 904 to shunt the transmitting contacts 502. This arrangement permits the completion of storing in tape 411 or 511 of any message then in process of being stored at which time, in the presence of a break condition, the recording of further messages is prevented even though the allotted maximum of three messages, as determined by the relays having the alphabetical designations CO and RO in Figs. 6 and 8, may not have been reached.

The break condition may be cleared out by the operation of Break Restore key 457 which connects ground over conductor 458 to the winding of relay 7BK, operating that relay. Relay 7BK interrupts the locking circuit for relay 3PR, assuming that relay 3LR has returned to the marking condition. Ordinarily, a break signal is not longer than a few seconds, so that the operation of key 457, before the end of a break signal, would be most unlikely. In the event that relay 3LR remains in spacing condition, due to a sustained line trouble, relay 3PR will not release. Relay 3PR releases relay 3RX which removes the shunt around the keyboard transmitters at the two message-originating positions by releasing either or both of the relays 3KB and 3KX, if operated, qualifying those keyboard transmitters for operation for the recording of further messages. Relay 3RX also reestablishes the circuit for transmitter clutch magnet 429, permitting transmission from tape 411 to be resumed. It will be understood that the break is not cleared by an operator by the operation of key 457 until the trouble that gave rise to the break has been eliminated, and if part of the message being transmitted was lost or garbled, it would probably be necessary for the operator to reset tape 411 in tape-sensing head 414 before operating key 457. The point is that if one of the transmitters was transmitting at the time that the break signal was registered, that transmitter will be afforded he opportunity to resume transmission.

A circuit that is completed when relay 3PR operates in response to a break signal, and that has not been traced previously, extends from ground through the armature 5 and front contact of relay 3PR, conductor 341, and winding of relay 2G to battery, and that relay operates. Relay 2G disconnects ground from a timing circuit comprising condenser 202, resistor 203, battery 204 and gas tube 206, and the circuit begins to time out. If relay 2G remains operated for a sufficient interval for tube 206 to fire, perhaps a minute or one and one-half minutes, relay 2SP will operate in the anode circuit of tube 206, locking through its armature 1 and front contact, and through the armature and front contact of relay 2ST. Condenser 202 discharges through the front contact and armature 4 of relay 2SP, and that relay, in operating, interrupts the external anode circuit for tube 206, so that the tube quenches and, condenser 202 being discharged, the timing circuit recycles. Relay 2SP, at its armature 2, interrupts the energizing circuit for relay 2ST, and at its armature 3, the relay 2SP completes the energizing circuit for stepping magnet 2ROT of a ten-point stepping switch having a contact bank 207 which has no connection to any contact, except the tenth, which is grounded. Relay 2ST has a slow-release characteristic, and does not interrupt the locking circuit of relay 2SP until tube 206 has had ample time to deionize.

When relay 2SP releases, following the release of relay 2ST, it interrupts the energizing circuit for stepping magnet 2ROT, causing advancement of the contactor into engagement with the first contact of contact bank 207. Relay 2SP also reestablishes the energizing circuit for relay 2ST which reoperates. With the stepping switch advanced to the first position, the off-normal contact actuator 208 of the stepping switch closes the off-normal contacts 209 and 211. The contacts 211 prepare an energizing circuit for release magnet 2RLS of the stepping switch, but the circuit is open at the inner armature of relay 2G. If the timing circuit, including condenser 202, fires tube 206 a second time before relays 3PR and 2G release, relays 2SP and 2ST will repeat the previously-described cycle, causing the contactor of contact bank 207 to advance to the second contact. The entire timing cycle is repeated, and stepping switch 207 is advanced step by step if relay 2G remains operated. Assuming the timing cycle to be one and one-half minutes, it will require fifteen minutes for the contactor of stepping switch bank 207 to reach the grounded tenth contact. If the break condition is cleared out by the operation of Break Restore key 457 before the end of that interval, relays 3PR and 2G will release, the relay 2G discharging condenser 202 to suspend the operation of the timing circuit. At its inner armature and back contact, the relay 2G completes the prepared circuit for release magnet 2RLS which disengages the holding pawl from the contactor of stepping switch 207, and permits the return of the contactor to its initial or normal position. In that position, the off-normal contact actuator 208 reopens the off-normal contacts 209 and 211, the latter interrupting the energizing circuit for release magnet 2RLS.

If the break signal is not cleared out before the contactor of the stepping switch has reached the grounded tenth contact, that contactor will then complete the circuit for relay 2SR. Relay 2SR locks through its front contact and armature 5, and the off-normal contacts 209 of the selector switch to ground. At the make contacts 4 controlled by armature 5 of relay 2SR, the circuit of release magnet 2RLS is completed, and the contactor of stepping switch bank 207 is released for spring return to its normal position, the off-normal contacts 209 opening and unlocking the circuit of relay 2SR when the stepping switch contactor has completed its return.

Before the release of relay 2SR, it completes the circuit of relay 2CH through the armature 2 and front contact of relay 2SR. A locking circuit for relay 2CH is extended through its armature 4 and front contact, conductors 212 and 342 to the left-hand contact of relay 7SX, which may be presumed to be engaged by its grounded armature at this time, because it has been assumed that signals are being transmitted from tape 411, and, accordingly, the energizing circuit of relay 7SX will be closed through the tape contacts 416 and conductors 419 and 701. If tape is also in storage at the second message-originating position, a supplementary locking circuit for relay 2CH will be traced from conductor 212, over conductor 343, to the left-hand contact of relay 9SX which is energized from its winding, over conductors 908 and 344, and the tape contacts 516.

With relay 2CH operated and contacts 416 closed, the ground connection on conductor 419 applied through those contacts is extended over conductors 721, 606 and 623, armature 2 and front contact of relay 2CH, conductors 213 and 431 to complete the energizing circuit of distributor clutch magnet 429 which sets in rotation shaft 433. Similarly, if contacts 516 are closed, the ground connection on conductor 344 from the contacts 516 will be extended over conductors 346, 347 and 214, armature 6 and front contact of relay 2CH, conductors 216 and 348, and winding of transmitter clutch magnet 529 to complete the energization of that magnet. At the same time, relay 2CH at its armature 1 and front contact, interconnects conductors 451 and 452 which are in the transmission circuit of transmitter 406 and, at its armature 7 and front contact, interconnects conductors 314 and 518 which are in the transmission circuit of transmitter 506, in effect, shunting the distributor contacts of the two transmitters. With the transmitter shafts 433 and 533 in operation, the tapes 411 and 511 will be stepped through their respective sensing mechanisms, will be sensed, the code combinations will be transferred to the transmitter contacts, and shafts 448 and 548 will be operated as if to transmit the code combinations, but because of the shunts across distributor contacts of the two transmitters, the signals will not, in fact, be transmitted to the distant station 308, and the effect will be to discard the stored messages in tapes 411 and 511 without transmitting them.

Relay 2CH also extends a ground connection over its armature 3 and front contact, and conductors 217 and 334 to operate relay 3KB for a purpose previously described, namely to place a shunt around the keyboard transmitter contacts 402, and prevent the prepartion of any message tape while the signals already in storage are being discarded. Similarly, a ground connection is extended through the armature 5 and front contact of relay 2CH and conductors 218 and 337 to operate relay 3KX for the purpose of shunting the keyboard transmitter contacts 502. Relays 3KB and 3KX lock through make contacts of relay 3PR, in the manner previously described, to maintain the keyboard transmitters disabled until the break condition shall have been cleared out by operation of Break Restore key 457.

With relay 2SR operated and locked for the interval during which selector 207 is returning to normal condition, the ground on conductors 623 and 214, if tape contacts 416 and 516 are closed, will be extended through the front contact and armature 1 of relay 2SR, in the case of conductor 623, and through the make contacts 3 controlled by armature 5 of relay 2SR in the case of conductor 214, to conductors 219 and 221, respectively, which extend to the windings of relays 6FO and 8FO, respectively. Considering the relay 6FO, it operates and locks through its armature 2 and front contact, conductors 604, 606, 721 and 419 to the tape contacts 416. At its armature 1 and back contact, it interrupts the locking circuit for any of the relay pairs 6CO and 6RO, 6CO1 and 6RO1, and 6CO2 and 6RO2 that may be operated. Since the messages in the tape 411 are being discarded, the count of those messages in the noted relays should also be discarded. At its armature 3 and front contact, the relay 6FO completes the operating circuit for slow-release relay 6FL. The circuit controlled by that relay begins at the back contact associated with the same armature of relay 6FO, so that no control is effected solely as the result of the operation of relay 6FL.

When the tapes 411 and 511 have been stepped through the tape-sensing heads, and those heads have moved in against reperforators 404 and 505, respectively, opening the tape contacts 416 and 516, the locking circuit for relay 2CH will be interrupted by whichever set of contacts 416 and 516 is the last to open. Relay 2CH, upon releasing, interrupts the paths that it had completed for the transmitter clutch magnets 429 and 529, and removes the shunts around the distributor contacts.

As the contacts 416 and 516 open, they interrupt the locking circuits of relays 6FO and 8FO, respectively. Relay 6FO interrupts the energizing circuit of relay 6FL, but that relay has a slow-release characteristic, and with relay 6FO released and relay 6FL still operated, an energizing circuit for relay 6BH is completed through the armature 3 and back contact of relay 6FO, and the armature and front contact of relay 6FL. Relay 6BH locks to relay 6BT in the manner previously described, and interrupts the energizing circuit of relay 6BT, which has a slow-release characteristic. Relay 6BH interrupts the circuit of relay 3AF, which may be presumed to have been operated because it was assumed that transmission was proceeding from tape 411 at the time of the break signal, and relay 8BH, operated when relay 8FO releases, provides for the release of relay 3AS, if that relay had been operated. When relay 6BT releases, after its delay interval, it unlocks relay 6BH which releases, restoring the operating circuit for relay 6BT. It is necessary for the operator to operate Break Restore key 457 and clear out the break condition before normal operation of the system can be resumed. Moreover, there is no longer any message material in storage in either tape awaiting transmission, and no outgoing transmission will occur until the operator prepares new message tape or resets the discarded message tape in the tape-sensing heads. The reason for the discarding of the tape, if the break condition remains until relay 2SR has been operated by the stepping switch, is that in certain kinds of message service, particularly in aircraft dispatching and traffic control communicaion systems, message information, which is ten or fifteen minutes old, is no longer of value because traffic conditions change so rapidly.

Each of the message-originating positions is provided with a manually operable tape feed-out key, designated by the reference numeral 459 in Fig. 4 and 559 in Fig. 5. When key 459 is closed, ground is extended over conductor 461 to operate the relay 6CK. Relay 6CK operates relay 6FO from a ground supplied over conductor 604 and other conductive path segments, previously identified, from closed tape contacts 416, through the armature 2 and front contact of relay 6CK. Relay 6CK, at its armature 1 and back contact, interrupts the locking circuits for the relay pairs 6CO and 6RO, 6CO1 and 6RO1, and 6CO2 and 6RO2 so that any of those pairs that had been operated in connection with the storing of messages in tape 411 will be released. At its armature 3 and front contact, the relay 6CK connects a ground over conductors 624, 626 and 418 to shunt the keyboard transmitting contacts 402, so that tape cannot be prepared during the tape feed-out operation.

Relay 6FO, upon operating, performs the operations previously described, including the provision of additional interruption in the locking circuits for the relay pair 6CO and 6RO, and the additional correspondingly identified relay pairs, locking to the ground supplied from contacts 416, applying ground through its front contact and armature 4 to conductor 624 to maintain a shunt on keyboard transmitter contacts 402, and closing through its armatures 5 and 6 and front contacts the energizing and locking circuits for relay 3AF to cause the operation of that relay, if relay 3AS, being operated, releases during the feed-out interval. Another operation performed by relay 6FO, as previously described, is the operation of relay 6FL.

Transmission from the message-originating position in Fig. 4 to the outgoing transmission channel may be stopped by the operation of stop key 462 which connects ground over conductor 463 to the winding of relay 3XA. That relay, as previously described, is releasable by relay 3AF, when the latter relay operates, to complete the energizing circuit for transmitter clutch magnet 429. If, with relay 3AF operated, stop key 462 is operated, the relay 3XA will in turn be operated to interrupt the circuit of the transmitter clutch magnet 429 and suspend transmission. Since, under that circumstance, the relay 3AF will remain operated, the transmitter in Fig. 5 cannot gain access to the outgoing channel and thus all transmission will be suspended until the release of key 462, which is a locking key. If key 462 should be operated while transmission is in progress from Fig. 5, that key will establish a circuit, which prevents the release of relay 3XA by relay 3AF, and when relay 3AS releases, and permits relay 3AF to be operated, no transmission will be initiated from tape 411 in Fig. 4 and thus all outgoing transmission will be suspended.

Each message-originating position is provided with a skip key, the one in Fig. 4 being designated by the reference numeral 464, and this key connects ground over conductor 466 to the upper armature of relay 3XA. If relay 3XA should be released at this time, by virtue of the operated condition of relay 3AF dependent upon active message transmission to the outgoing channel from Fig. 4, the ground connection will terminate at the upper armature of relay 3XA. When relay 3AF releases, incident to the transmission of an end-of-message signal from tape 411, the relay 3AF reoperates. The ground connection is extended from the upper armature of relay 3XA, over conductors 349, 619 and 618, to the winding of relay 6BH which operates. This relay interrupts the paths for operating and holding relay 3AF, so that the latter relay cannot become operated. It follows that the message-originating position in Fig. 4 is deprived of any opportunity to transmit to the outgoing channel as long as relay 6BH is held operated from the skip key 464, and the message-originating position in Fig. 5 will be able to transmit successive messages without offering transmission turns to the message-originating position in Fig. 4.

Upon the release of key 464, the circuit of relay 6BH will be interrupted, and that relay will release because its locking circuit will already have been interrupted by the release of relay 6BT due to interruption of its energizing circuit at the armature 3 and back contact of relay 6BH. Upon the release of relay 6BH, the message-originating position in Fig. 4 will again be able to gain access to the outgoing transmission channel.

Reference was made early in the specification to the fact that relay 7SX operates its armature from the right-hand to the left-hand contact when tape contacts 416 close, and that the relay remains thus operated as long as those contacts are closed. It was also stated that the timing circuit for tube 707 does not begin to time out because it is repetitiously grounded over conductor 601, break contacts 6 controlled by armature 9 of relay 6CO, conductor 422 and universal contacts 421 as the reperforator 404 continues to respond to message signals and record them in tape 411. Once the relay 6CO has operated, in response to the end-of-message signals representing the completion of one message in tape 411, a steady ground connection is applied to conductor 601, through the armature 4 and front contact of relay 6CO, so that tube 707 cannot be fired. However, it may happen that an operator may begin the recording of a message in tape 411 at a time when there is none in storage in that tape, or alternatively when there are messages in storage in the tape, not exceeding two in number, and the operator may suspend the operation of the keyboard transmitter, leaving an incomplete message in tape 411. If the operator suspends the preparation of the message when no others are in storage, the universal contacts 421 will not repetitiously close, ground will be removed from condenser 702, and the timing circuit will begin to time out. Alternatively, if there are messages in storage in the tape, the relay 6CO will release at the end of transmission of the last complete message in the tape, and will disconnect the ground so that in either case the condenser 702 will begin to charge.

After an interval of time determined by the circuit constants, condenser 702 will fire tube 707 which operates the relay 7EF included in its anode circuit. The relay locks through its front contact and lower armature, conductor 731, and back contact and outer lower armature of relay 7HR to ground. At its inner upper armature, the relay 7EF grounds and discharges condenser 702 to restore the timing circuit. At its outer upper armature, the relay 7EF connects ground over conductor 732 to light lamp 467 as an alarm signal to inform the operator that there is an incomplete message in tape 411.

When the operator completes the message including the end-of-message signal, or alternatively records an end-of-message signal without completing the message, the relays 7FG, 7FH, 7UX and 7HR will respond to the end-of-message signal in the manner previously described, and the relay 7HR will interrupt the locking circuit for relay 7EF, permitting it to release. Relay 7EF extinguishes lamp 467.

Reference was made previously to the key 417 which is operated to its lower position when keyboard transmitting contacts 402 are to be operated to record a message in tape 411, the selector magnet 403 being connected in series with the selector magnet of reperforator 404 to produce a home copy of the message being recorded. When the key 417 is operated to its upper position, the selector magnet 403 is connected to monitor outgoing transmission from tape 411, and for that purpose the relay 3MO1 has its operating winding included in the outgoing transmission channel. With the key 417 operated to its upper position, a circuit is traced from battery on the armature of relay 3MO1 through the marking contact, conductor 351, the right-hand make contacts of key 417, the winding of selector magnet 403, the left-hand make contacts of key 417 to ground at the lower contacts of key 417, the connection being positive and independent of the condition of the lower contacts. Each time that relay 3MO1 operates to its spacing condition, a spacing signal element will be repeated by it to selector magnet 403 of teletypewriter 401. With key 417 in this condition, namely operated to its upper position, the lower contacts thereof are closed, applying ground to selector magnet 409 of reperforator-transmitter 404 to hold that reperforator idle and in the steady marking condition. A companion relay 3MO2 provides for the transmission of signals outgoing on a transmission channel to selector magnet 503 of teletypewriter 501 when monitoring key 517 is operated through its upper position.

Although a specific embodiment of the invention has been shown in the drawings and described in the accompanying specification, it will be understood that the invention is not limited to the specific embodiment shown and described, but is capable of modification, rearrangement and substitution of parts and elements without departing from the spirit of the invention.

What is claimed is:

1. In a telegraph system, a keyboard transmitter, a reperforator adapted to store in the form of perforated tape messages generated by said keyboard, a tape transmitter associated with said reperforator for transmitting the messages stored in said perforated tape, an outgoing transmission channel connected to said tape transmitter, means for registering reception of a break signal incoming over said channel, means controlled by said break signal registering means for arresting said tape transmitter if in operation, means also controlled by said break signal registering means for conditioning said keyboard transmitter to be disabled, means responsive to the next end-of-message signal generated by said keyboard transmitter for completing the disablement thereof, and manually operable means for canceling the registration of said break signal and for requalifying said tape transmitter and said keyboard transmitter for operation.

2. In a telegraph system, a tape transmitter, means for producing perforated tape containing message signals to be transmitted by said transmitter, an outgoing transmission channel connected to said transmitter, means responsive to a break signal incoming over said channel for arresting said transmitter, means also responsive to said break signal for timing a predetermined interval, and means operable by said timing means upon timing said interval for shunting the transmitting elements of said transmitter and for setting in operation said transmitter to thereby discard the signals accumulated in said tape.

3. In a telegraph system, a tape transmitter, keyboard controlled means for producing perforated tape containing message signals to be transmitted by said transmitter, an outgoing transmission channel connected to said transmitter, means responsive to a break signal incoming over said channel for arresting said transmitter, means also responsive to said break signal for timing a predetermined interval, and means operable by said timing means upon timing said interval for shunting the transmitting elements of said transmitter, for setting in operation said transmitter to thereby discard the signals in said tape and for disabling said keyboard controlled tape producing means during the signal discarding operation of said transmitter.

4. In a telegraph system, a source of message signals, a message tape perforator responsive to said signal source, message transmission means controllable by message tape produced by said perforator, counting means for cumulatively registering completed messages in said tape, relay means for initiating operation of said message transmission means, signal transmission suppression means, responsive to said initiating means, for suppressing actual signal transmission during such operation, thereby to discard the tape prepared by said perforator, and other relay means operable incident to the discarding of the tape for canceling a message count from said counting means.

5. In a telegraph system, a keyboard controlled source of message signals, a reperforator-transmitter responsive to message signals generated by said source, a transmission channel associable with said reperforator-transmitter for transmitting message signals recorded by the reperforator portion of said reperforator-transmitter, means operable upon response of said reperforator-transmitter to an end-of-message signal received from said source for registering a bid of said reperforator-transmitter for access to said channel, and means operable upon suspension of operation of said source without supplying an end-of-message signal for registering and sustaining an alarm until the generation of an end-of-message signal.

6. In a telegraph system, at least two tape transmitters, means for supplying tape containing message signals for transmission by said transmitters, an outgoing transmission channel, means for effectively associating said transmitters with said channel rotationally by turns for the transmission of one complete message in each turn, means for remotely impressing a break signal on said channel, transmitter control means responsive to said break signal for arresting any transmitter then effectively associated with said channel and in process of transmitting thereto, means also responsive to said break signal for timing a predetermined interval, means operable by said timing means upon timing said interval for shunting the transmitting elements of said transmitters and for setting in continuous operation any of them having tape containing message signals awaiting transmission, whereby to discard said waiting message signals, and means responsive only to exhaustion of the supply of tape containing message signals in each transmitter for causing arrestment of the individual transmitter to suspend said signal discarding operation.

7. In a telegraph system, at least two tape transmitters, means for supplying tape containing signals comprising message sequences terminated by end-of-message signals for transmission by said transmitters, an outgoing transmission channel, means for effectively associating said transmitters with said channel rotationally by turns, means responsive to said end-of-message signals for determining the end of a transmitting turn of a transmitter and causing its arrestment, means for remotely impressing a break signal on said channel, transmitter control means responsive to said break signal for arresting any transmitter then effectively associated with said channel and in process of transmitting thereto, means also responsive to said break signal for timing a predetermined interval, means operable by said timing means upon timing said interval for setting in operation any of said transmitters having tape containing message signals awaiting transmission, whereby to discard said waiting message signals, and means for precluding arrestment of said transmitters under control of said end-of-message signals during said discarding operation.

8. In a telegraph system, at least two tape transmitters, means for supplying tape containing signals comprising message sequences terminated by end-of-message signals for transmission by said transmitters, an outgoing transmission channel, means for effectively associating said transmitters with said channel rotationally by turns, means responsive to said end-of-message signals for determining the end of a transmitting turn of a transmitter and causing its arrestment, means for suspending access of all of said transmitters to said channel including arrestment of any transmitter then effectively associated with said channel and in process of transmitting thereto, means also responsive to the last-mentioned means for timing a predetermined interval, means operable by said timing means upon timing said interval for setting in operation any of said transmitters having tape containing message signals awaiting transmission, whereby to discard said waiting message signals, and means for precluding arrestment of said transmitters under control of said end-of-message signals during said discarding operation.

References Cited in the file of this patent

UNITED STATES PATENTS

| | | |
|---|---|---|
| 1,525,522 | Vernam | Feb. 10, 1925 |
| 2,008,909 | Hersehy | July 23, 1935 |
| 2,380,894 | Coleman | July 31, 1945 |
| 2,486,699 | Bacon | Nov. 1, 1949 |
| 2,501,063 | Levin | Mar. 21, 1950 |
| 2,575,329 | Blanton et al. | Nov. 20, 1951 |
| 2,599,988 | Halvorsen | June 10, 1952 |
| 2,667,533 | Zenner | Jan. 26, 1954 |
| 2,708,216 | Doerrfeld | May 10, 1955 |